United States Patent [19]

Mark

[11] Patent Number: 4,792,945
[45] Date of Patent: Dec. 20, 1988

[54] LOCAL AREA NETWORK SYSTEM
[75] Inventor: Jon W. Mark, Waterloo, Canada
[73] Assignee: University of Waterloo, Waterloo, Canada
[21] Appl. No.: 936,434
[22] Filed: Dec. 1, 1986
[30] Foreign Application Priority Data Nov. 29, 1985 [GB] United Kingdom ................ 8529369
Jun. 4, 1986 [CA] Canada .................................. 510820

[51] Int. Cl.⁴ ............................................. H04S 3/00
[52] U.S. Cl. ..................................... 370/85; 370/89; 370/94; 370/110.1; 340/825.05
[58] Field of Search ................... 370/60, 94, 85, 89, 370/110.1, 86, 87, 88; 340/825.5, 825.52, 825.05

[56] References Cited
U.S. PATENT DOCUMENTS

| 4,602,365 | 7/1986 | White et al. | 370/89 |
| 4,650,581 | 3/1987 | Kozlik et al. | 370/85 |
| 4,652,874 | 3/1987 | Loyer | 370/86 |
| 4,670,873 | 6/1987 | Cour et al. | 370/88 |

OTHER PUBLICATIONS

The Twelfth Biennial Symposium on Communications; Jun. 4, 1984; "Integrated Voice/Data Systems on Welnet"; Mark et al; pp. A.1.0–A.1.4.
Globecom '83; San Diego; Nov./Dec. 1983; "Integrated Voice/Data Services on a Dual Ring Local Area Network"; Mark; pp. 11.1.0–11.1.5.

Primary Examiner—Douglas W. Olms
Assistant Examiner—Frank M. Scutch, III
Attorney, Agent, or Firm—Anthony Asquith & Co.

[57] ABSTRACT

The LAN system disclosed is a development of the WELNET® system, in which scheduling arrangements between the stations is controlled by a scheduling channel in the form of a loop, separate from the main information channel. The invention provides for Voice and Data to be integrated on the LAN. On a periodic cycle, scheduling is interrupted, and each station is invited to put a Voice packet on the main channel. When the system goes back to Data, the system is so configured as to resume at the station which was about to transmit Data when the schedule was interrupted for Voice.

10 Claims, 1 Drawing Sheet

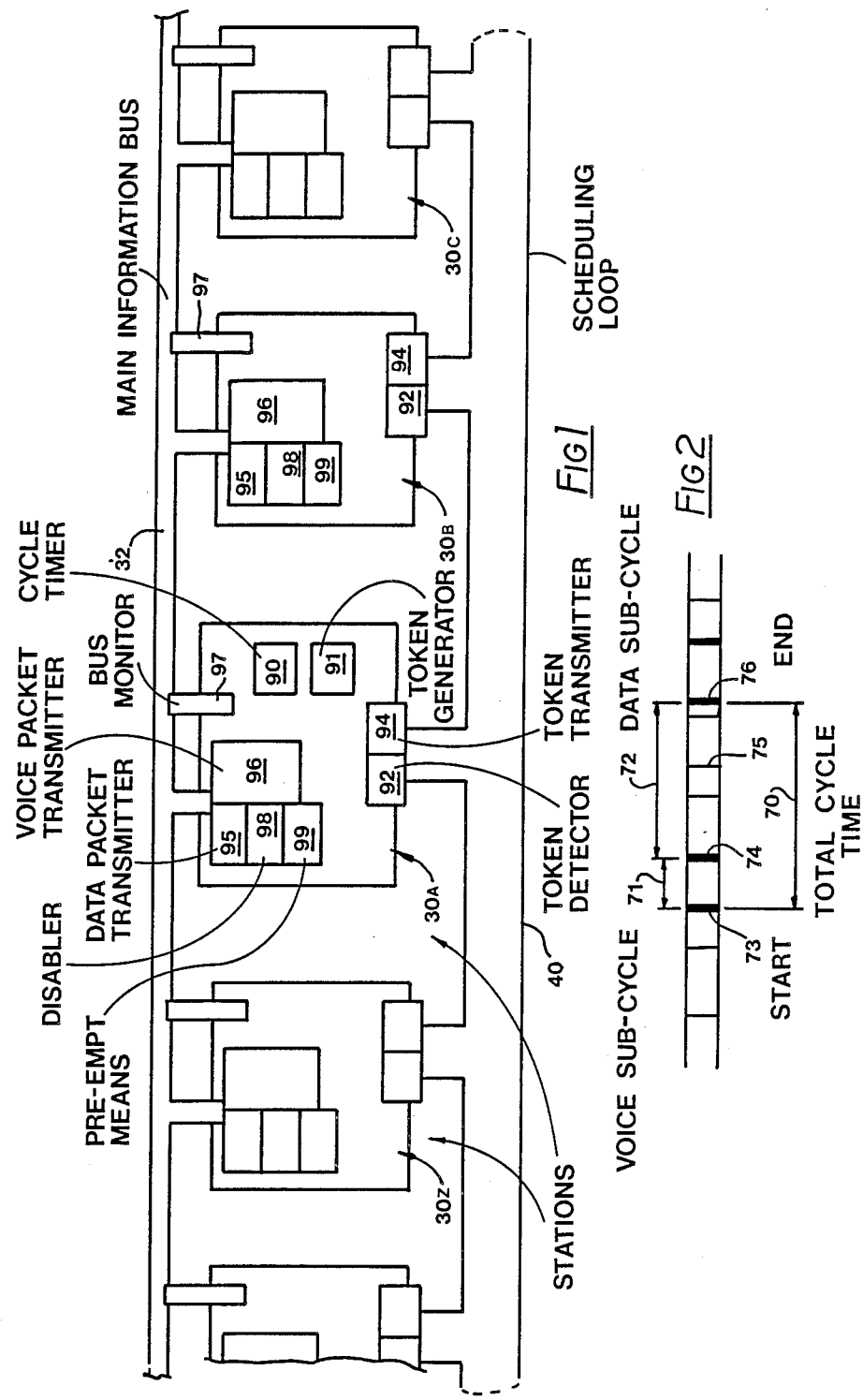

LOCAL AREA NETWORK SYSTEM

This invention relates to Local Area Network (LAN) systems, of the kind used for sending digital information between stations connected to the LAN. In particular, the invention relates to the integration on the LAN of both Voice and Data services.

BACKGROUND OF THE INVENTION

In the type of LAN to which the invention is applicable, there is a main information channel, which may be arranged in a bus configuration. The stations are connected in multidrop fashion to the main information channel, and the information is put onto the main channel in the form of discrete packets.

For a LAN to be suitable for Voice/Data integration, as in the invention, the LAN should be of the kind that incorporates a scheduling procedure. By means of the scheduling procedure, the LAN can be arranged to give each station in turn an opportunity to put Voice packets and Data packets onto the main channel.

In some LANs, the scheduling function is provided by sending the scheduling signals from station to station via the main channel. In other LANs, an extra scheduling channel is provided, which is separate from the main channel, for scheduling.

It is preferred, for the purposes of the invention, that the LAN is of the kind in which the scheduling is done on a separate scheduling channel. If the scheduling were to be done on the main channel, the cheduling signals would have to be intercalated with the information packets and consequently there would be a loss of capacity in the main channel.

The main channel is an expensive item, having the capability of transmitting hundreds of megabits per second. By providing a separate channel for scheduling, the capacity of this expensive channel can be fully utilized. The scheduling channel on the other hand can be quite inexpensive, because the scheduling channel need only transmit the scheduling information, not the packets of information.

It is recognised in the invention that the Welnet (Trademark) LAN System is especially suitable for the integration of Voice and Data. In the Welnet system, a separate scheduling channel is provided. The scheduling channel is in the form of a loop, and the scheduling signals are passed from station to station around the loop. Each station is capable of receiving a scheduling signal only from the station preceding it in the loop, and each station is capable of transmitting a scheduling signal only to the station after it in the loop.

The scheduling signals may be regarded as tokens. Only when a station has the correct token is the station allowed to put its information packet, either a Voice packet or a Data packet, if it has one ready, on to the main channel. Each station has the opportunity to send only one packet of information onto the main channel, when it has the token. The station must then wait until it receives another appropriate token before it can transmit a further packet of information onto the main channel.

In the Welnet system, a station (e.g. station J) transmits the token to the next station (station K) on the scheduling channel at the same time as station J puts its information packet onto the main channel. Station K, upon receipt of the token, and if it has an information packet to send, monitors the main channel (in fact each station monitors the main channel all the time) and when the main channel is clear, i.e. when the information packet from station J has finished, station K puts its information packet onto the main channel.

In the Welnet system, each station passes the token as soon as that station has started to transmit its packet on to the main information channel. Thus, in a Welnet LAN, the scheduling token and the information packet are sent out at the same time, and in parallel.

In the Welnet LAN, the scheduling channel has a much lower bit-transmission-rate capability than the main channel. A system with a separate scheduling channel, like the Welnet LAN System, would be to some extent uneconomical if the scheduling channel had to be as expensive as the main channel. It is recognized in the invention that, as a result of the relative crudeness of the scheduling channel, the tokens that pass around the scheduling channel should be kept very simple, i.e. very short. If it were to take an appreciable time to transmit the tokens -- i.e. if the tokens were to consist themselves of a large number of bits -- then the scheduling channel would have to be sophisticated.

It is recognized, in the invention, that the scheduling signals, i.e. the token or tokens, therefore should occupy as few bits as possible. The invention lies in recognizing how the small number of bits that are thus available for the tokens can be used to ensure efficient and trouble-free scheduling of integrated Voice and Data services.

GENERAL DESCRIPTION OF THE INVENTION

The invention is applicable not only to the Welnet LAN but is applicable in general to the type of LAN which includes a relatively low-capacity scheduling channel, in the form of a loop, in addition to the main channel, which may be in the form either of a loop or of a bus. In this specification, however, the invention is explained in relation to the Welnet system.

For good quality speech transmission, priority should be given to the Voice packets. Computer-generated information, i.e. the Data packets, should, in an integrated system, be transmitted during the pauses between the Voice packets. It is also recognized that, if the traffic on the LAN is heavy, it is the Data packets that should be delayed, not the Voice packets. Transmitted speech would become of noticeably poorer quality if the Voice packets were to be delayed.

It is recognized in the invention that when the Data packets are delayed, to make way for Voice packets, the problem can arise that some of the stations have substantially fewer opportunities, overall, to put Data packets onto the main channel than other stations.

The invention provides, in the scheduling function, a means for pre-empting those stations that have already transmitted Data. The effect is that when the LAN reverts to Data, after Voice, the system resumes, not at the leader station each time, but at the station that was next in line to transmit Data.

The provision of this pre-empting facility means that more Voice stations can be present on the LAN, without compromising the transmission of Data. In the invention, none of the stations receives an unfair number of opportunities to transmit Data-packets, at the expense of the other stations, even if there are many Voice stations on the LAN. But without the invention, if the number of Voice stations were high, then the later Data stations on the loop would, at least sometimes, receive markedly fewer opportunities to transmit Data.

The invention permits the cycle time between periods of Voice and Data transmissions to be optimized. In this specification, the "cycle" time is the time between successive rounds of Voice transmissions.

In deciding what the cycle time should be, the following factors should be borne in mind:

1. A burst of speech at a station, having been digitized, can be transmitted on the main channel in a small fraction of the time it took to make the burst of speech in real time. For example, a 32 kbps voice source can be transmitted on a 10 Mbps bus in about one three-hundredth of the real speech time.

2. Before each packet can be transmitted on the main channel, station identifier and other signals have to be appended, which represents an overhead. The fact that the overhead is needed suggests to the system designer that the round time should be long, so that the information part of the packet is long compared to the overhead. From this standpoint, the cycle time should be as long as possible, so that the time spent on the non-information part of the transmission is only a small proportion of the total time the station occupies the main channel.

3. From a speech quality point of view, the time-interval between the Voice packets should not exceed about 20 milliseconds, otherwise the delay becomes noticeable to the people who are conversing. Sometimes, however, a low quality of speech transmission can be tolerated, at least temporarily, in which case the cycle time can be 50 milliseconds, or even more. A typical value, for normal good quality speech transmission, would be in the 10 to 20 millisecond range. Also from the speech-quality point of view, the variation on the delay should be kept as small as possible.

BRIEF DESCRIPTION OF THE DRAWINGS

An example of a Local Area Network, set up to incorporate the invention, will now be described with reference to the accompanying drawings, in which:

FIG. 1 is a diagram of the physical layout of the LAN;

FIG. 2 is a timing diagram of the cyclic events at one of the stations on the LAN.

DETAILED DESCRIPTION OF THE PREFERRED EMBODIMENT

The LAN system shown in FIG. 1 is based on a Welnet (TM) system, and includes several stations 30, connected to a main information channel (which in this case is in the form of a bus 32) in parallel, or multidrop fashion.

Each station 30 is connected also to a scheduling channel, which is in the form of a ring or endless-loop 40.

One 30A of the stations 30 is designated the leader-station, and this station includes a cycle-timer 90. The leader-station 30A also includes a token-generator 91, which is effective to put a number of kinds of tokens onto the scheduling loop 40.

The arrangement of the system is such that the leader-station 30A can pass tokens only to station 30B. Station 30B can pass tokens only to station 30C, and so on. Similarly, each station can receive tokens only from the preceding station on the loop 40. The leader-station 30A can receive tokens only from station 30Z. The leader-station has no direct communication with the stations on the scheduling loop 40, other than by means of the tokens which are passed from station to station.

Each station 30 includes a token-detecting-means 92, which is effective to detect the fact that a token has arrived at the station 30. The token detecting-means 92 is effective also to determine which of four types the arriving token is, namely: a Null-token, a Voice-token, a Data-token, and a Preempt-token. The fact that there are only four tokens means that the four tokens can be represented by just one pair of binary digits (bits), i.e. 00, 01, 10, and 11.

The token-generator 91 at the leader-station 30A is effective to generate the four different kinds of token. Each station 30 includes a respective means to generate a Preempt token, under the circumstances as will be explained below.

Each station includes a token-transmitting-means 94, which is effective to pass the token on to the next station on the loop 40.

At least some of the stations include a Data-packet-transmitting-means 95, which, when scheduled to do so, is effective to transmit the station's next Data packet onto the main bus 32. Some of the stations 30 also include a respective Voice-packet-transmitting-means 96, which similarly is effective, when scheduled to do so, to transmit the station's next Voice-packet onto the bus 32.

The basic operation of the Welnet LAN system may be described as follows.

At the start of the cycle, the leader 30A issues first a Null-token, the purpose of which will be discussed below. The Null-token travels straight round the loop 40, from station to station, until the Null-token arrives back at the leader-station 30A. It may be taken that the circulation time of the Null-token is practically instantaneous.

Upon the return of the Null-token, the leader-station 30A issues a Voice-token, which travels along the loop 40 until it arrives at the next station to the leader, station B. If station B has a Voice packet to transmit, the Voice transmitting-means 96B of station B now puts that Voice-packet onto the bus 32. At the same time, the token-transmitting-means 94B of station B sends the Voice-token onto the scheduling loop 40.

The Voice-token arrives at station C. Each station includes a bus monitoring-means 97, which constantly monitors the bus, to determine, among other things, whether the bus is clear. The Voice-token therefore remains at station C until station B has finished with the bus. Then, when the bus is clear, station C puts its own Voice-packet onto the bus, and, once station C's Voice-packet is established on the bus, station C transmits the Voice-token to the next station. This procedure continues until the Voice-token arrives back at the leader station 30A.

If any station happens not to have a Voice-packet to transmit, the token detecting-means 92 and the token transmitting-means 94 of that station act to pass the Voice-token straight on around the loop 40 to the next station.

When the Voice-token arrives back at the leader station 30A, the Voice sub-cycle is finished. Next, the token generator 91 at the leader station puts a second Null-token onto the loop 40.

It may be noted that the Voice-token travels around the loop just once during the Voice sub-cycle. The time taken to complete the Voice sub-cycle depends on how many of the stations have transmitted a respective Voice-packet.

The Data sub-cycle now starts, and the leader-station puts out a Data-token. The effect of the Data-token on the stations corresponds to the effect of the Voice-token, in that the token-detecting-means 92 detects the arrival of the Data-token, and triggers the Data-packet-transmitting-means 95 of the station to put a Data-packet, if there is one waiting at that station, onto the bus.

When the Data-token arrives back at the leader-station 30A, the token-generator 91 at the leader-station transmits a further Data token onto the scheduling loop 40, which similarly circulates from station to station around the loop. And, as long as the cycle timer 90 indicates that there is still time left in the current cycle, the Data-tokens continue to pass from station to station.

It will be noted that if there is little Voice traffic on the LAN, there is time, within the overall cycle-time, for the Data-token to travel around the loop many times. However, if the Voice traffic is heavy, there may hardly be time for the Data-token to travel around the loop once.

When the timer 90 indicates that the cycle-time is up, the leader-station circulates a further Null-token around the loop, followed by a Voice-token, and the cycle starts again.

If Voice traffic is light, there may be plenty of time left in the Data sub-cycle for, say, 15 or more circulations of the Data-token. That number of circulations or rounds of the Data-token means that each station receives virtually the same number of chances as all the other stations to put its Data-packets onto the bus.

If, however, there is heavy Voice traffic on the bus, there may be time only for, say, 1 or 2 circulations of the Data-token per cycle. Therefore, in the case where there is heavy Voice traffic, it may be inferred that station 30Z and the rest of the later stations in the loop will have significantly fewer opportunities to put their Data-packets onto the bus than stations 30B, 30C, etc. at the beginning of the loop.

FIG. 2 is a diagram showing the cycle of operations that take place at the leader-station 30A. In FIG. 2, the total cycle time 70 comprises the Voice sub-cycle 71 and the Data sub-cycle 72. At the start of the cycle, i.e. at point 73, the leader 30A issues a Null-token to station 30B, and receives the Null-token back from station 30Z a moment later. The leader then immediately issues a Voice-token to station 30B.

At point 74, the leader receives the Voice token from station 30Z, sends the Null-token once more around the loop, receives the returning Null-token, and issues the Data-token. This sequence takes place practically instantaneously. The Data-token circulates from station to station, arriving back at the leader 30A at point 75. The Data-token continues to circulate until the cycle timer 90 indicates the end 76 of the cycle. Thereupon, the leader issues the Null-token.

It will again be noted that the later stations on the loop may receive fewer opportunities to put their Data-packets onto the bus 32.

It is recognised in the invention that the limitation imposed by this aspect of operation of such LANs as Welnet, can be eliminated in a very simple, inexpensive manner. The invention provides the Preempt facility, by which all the stations on the LAN receive the same number of opportunities to put Data-packets on the bus. As a result, the invention allows more Voice stations to be included on the LAN, without the expected corresponding deterioration in the quality of the transmitted speech, and without compromising the Data stations.

To effect the Preempt facility, each station 30 is provided with a disabling-means 98. The disabling-means 98 has two states: in the first state, the disabling-means is effective to prevent the Data-packet-transmitting-means 95 of the station from putting a Data packet onto the bus. In the second state, the disabling-means 98 allows the Data-packet-transmitting-means 95 to put the Data-packet onto the bus. In both states, the disabling-means 98 does not affect the ability of the Voice-packet-transmitting-means 96 to put a Voice packet onto the bus.

Each station includes also a Preempt-means 99. The Preempt-means 99 is responsive to the arrival of the Preempt-token, and the Preempt means is effective to toggle the disabling-means 98 between the two states.

The operation of the Preempt-means is as follows. When the timer 90 indicates that the cycle is ended, the token generator 91 sends out a Null-token. The Data-token, at this point, when the Null-token is being dispatched, of course is out at one of the stations, e.g. at station 30K. It is arranged that the Null-token passes unchanged through stations 30B to 30J. When the Null-token reaches station 30K, the Null-token is cancelled, and station 30J issues the Preempt-token, which then continues around the loop 40, from station 30L through to station 30Z, and so back to the leader-station 30A.

Upon receipt of the Preempt-token, the leader station issues the Voice token, to set in motion the Voice stage of the new cycle.

It is arranged that the passage of the Preempt-token through a station is effective to toggle the disabling-means 98 to the second state, i.e. the state where the disabling-means 98 allows the Data transmitting means 95 to put the Data-packet onto the bus 32. It is arranged that the passage of a Data-token through a station, followed in sequence by the passage of a Null-token through the station, is effective to toggle the disabling-means 98 to the first state, i.e. the state where the disabling-means 98 prevents the Data-transmitting-means 95 from putting a Data-packet onto the bus.

Thus, when the Data stage of the next cycle comes round, the Data token is passed through the stations 30B to 30J, and those stations cannot put Data-packets onto the bus. In the new cycle, the first station to have an opportunity to put a Data-packet onto the bus is station 30K.

This particular manner of effecting the Preempt facility is not the only one contemplated in the invention. It can be arranged that other particular sequences of tokens can be detected at the stations, which will achieve the same function, i.e., the function of resuming Data-packet-transmission at the point on the loop where Data-packet-transmission was interrupted.

The invention lies in recognizing that when the scheduling channel is so arranged that the stations have access only to the adjacent stations on the loop, as in the Welnet LAN, and have no direct access to the leader, then the Preempt facility is advantageous. It is recognised that the Preempt facility can be carried out, without compromising any other aspects of the performance of the LAN, by using just four different kinds of tokens.

It is recognised also that the Preempt facility can be achieved virtually for nothing. Four tokens need only two bits, and since the scheduling signals on Welnet and similar LANs have to include in any case three kinds of tokens, the fourth token can be accommodated in what amounts to a "spare" pair of bits.

It is not a limitation of the invention that the cycle time should be fixed. The leader station may, for example, include means for adjusting the cycle time in accordance with the traffic, or with other parameters, to achieve optimisation of the LAN. Also, the status of "leader" can be transferred from one station to another, from time to time, as dictated by other needs of the system.

It is not a limitation of the invention that all the scheduling must be done solely on the scheduling loop 40. It will often be the case that there is more than one transmitting device at a station, in which case a certain degree of pre-scheduling, at the station, will be needed.

One of the four tokens used in the Welnet system is the Null-token. The purpose of the Null-token may be explained as follows. If there is noise on the loop, false signals may circulate back to the leader station, and be picked up as tokens. Thus if a spurious Voice-token appears on the loop while the legitimate Voice-token is out on the loop, two stations will be trying to put Voice-packets on the loop at once. This is no problem in itself, since each station monitors the bus, and only one packet can go onto the bus at one time.

The problem is that the leader-station, upon receipt of the Voice-token, will thereupon end the Voice sub-cycle, and will issue a Data-token. The leader cannot distinguish between the spurious Voice-token and the legitimate one. Without the Null-token, scheduling would be very inefficient, because there would be Voice tokens and Data-tokens circulating around the loop together. The Preempting facility of the invention, especially, would therefore not work properly. The action of circulating the Null-token means that a spurious signal cannot last for more than one sub-cycle. The Null-token limits the effect of the presence of a spurious token merely to a momentary slight loss of efficiency.

I claim:

1. Local Area Network (LAN) system, which comprises:
   a main information channel;
   many stations, where each station is able to put digitised information onto the main channel in the form of discrete packets;
   where the packets from some of the stations sometimes comprise packets of Voice information, and the packets from certain of the stations sometimes comprise packets of Data information;
   a scheduling channel in the form of a loop, connected in series from station to station;
   where each station includes a means, which is responsive to the presence of a token signal on the loop at that station, for enabling the station to put a respective one of the packets onto the main channel;
   where each station includes means for distinguishing between a Voice token-signal and a Data token-signal;
   where one of the stations, designated the leader station, includes means for issuing the said Voice and Data token signals onto the scheduling loop;
   where the leader station is provided with a timing means;
   where each station includes a token-passing means which is effective to pass the token signal from station to station around the scheduling loop;
   where each station includes a means for ensuring that each station can only put such a Voice packet onto the main channel when that station has the Voice token, and can only put such a Data packet onto the main channel when that station has the Data token;
   where the system is characterised by being so adapted and arranged;
   that the leader issues the tokens in a regular periodic cycle, the total cycle comprising a Voice sub-cycle and a Data sub-cycle;
   that, in the Voice sub-cycle, the leader issues one of the Voice token-signals onto the loop,
   where the Voice sub-cycle ends when the said Voice token arrives back at the leader, having been round the loop;
   that, in the Data sub-cycle, the leader issues one of the said Data token-signals onto the loop, and when the Data-token arrives back at the leader, the leader issues a further Data-token onto the loop;
   that the leader starts the Data sub-cycle at the said end of the Voice sub-cycle;
   that the leader ends the Data sub-cycle upon the expiry of a predetermined period of time, set by the timing means, after the start of the Voice sub-cycle;
   that the station which has the Data token at the moment the Data sub-cycle ended is termed the pre-empted station;
   and that at the start of the next Data sub-cycle, none of the stations are able to transmit packets onto the main channel until the Data token arrives at the pre-empted station, upon which the pre-empted station is able to put its Data packet onto the main channel.

2. LAN of claim 1 further characterised:
   in that each station includes means capable of distinguishing between four different token-signals on the scheduling loop, where the four token signals are the said Voice (V) token, the said Data (D) token, a Null (N) token, and a Pre-empt (P) token.

3. LAN of claim 2, further characterised:
   in that the four token signals comprise respectively the four different signals that can be transmitted by a pair of binary digits, namely 00, 01, 10, and 11.

4. LAN of claim 2, further characterised in that the stations are so adapted and arranged:
   that at the end of the predetermined period, the leader issues the N token which is passed from station to station until the N token arrives at the pre-empted station;
   that each station passed by the N token adopts a "may not" status, under which that station may not place a Data packet onto the main channel;
   that at the pre-empted station, the N token becomes the P token;
   that the P token is passed from station to station around the loop until it reaches the leader;
   that each station passed by the P token adopts a "may" status, under which that station may place a Data packet onto the main channel;
   that the leader, upon receipt of the P token, issues the V token onto and around the loop;
   that the leader, upon return of the V token, and at the start of the Data sub-cycle, issues the D token onto and around the loop;
   that each station which had adopted a "may not" status passes the D token without putting its respective Data packet into the main channel;

and that each station which has adopted a "may" status may, upon receipt of the D token, put its respective Data packet onto the main channel.

5. LAN of claim 4, further characterised in that the stations are so adapted and arranged:
that the passing of the D token at the start of the Data sub-cycle is effective to change the status of a station with a "may not" status to a "may" status.

6. LAN of claim 5, further characterised in that the stations are so adapted and arranged:
that the leader issues the N token onto and around the loop at the end of the Voice sub-cycle.

7. LAN of claim 1, further characterised in that the length of the said predetermined period is about 20 milliseconds.

8. Local area network (LAN) system, characterised:
in that the system includes a main information channel;
in that the system includes many stations, which are each capable of putting digitised information onto the main-channel in the form of a sequence of discrete packets, where some of the packets comprise Voice-packets and some comprise Data-packets;
in that the system includes a scheduling channel in the form of a ring or loop, connected from station to station;
in that each station includes a respective detection means, which is capable of detecting the differences between different kinds of scheduling signals or tokens arriving at the station on the scheduling loop;
in that the said kinds of tokens, between which the station is capable of detecting the difference, include a Voice-token, a Data-token, and a Preempt-token;
in that the station includes a respective Data-transmitting means, which is effective, upon the arrival of the Data-token at the station, to put the station's next Data-packet onto the main-channel;
in that the station includes a respective Voice-transmitting means, which is effective, upon the arrival of the Voice-token at the station, to put the station's next Voice-packet onto the main-channel;
in that the station includes a respective actuable disabling means, which is actuable between a first state and a second state, where the disabling means, when in the first state, is effective to prevent the said Data-transmitting means from putting the station's next Data packet on the main-channel, and when in the second state, the disabling means is effective to allow the Data-transmitting means to put the station's next Data-packet onto the main-channel;
in that the disabling means, when in the first state, is effective to allow the Voice-transmitting means to put the station's next Voice packet onto the main-channel;
and in that the station includes a respective Preempt-means, which is effective, upon the arrival of the Preempt-token at the station, to change the state of the disabling means.

9. System of claim 8, further characterised:
in that the system includes a timing means, which is effective to ensure that, at periodic intervals, each station has an opportunity to put a Voice-packet onto the main-channel.

10. System of claim 8, further characterised:
in that the system includes means for ensuring that each station can receive the said scheduling tokens only from the one station preceding it in the scheduling loop, and from no other station.

* * * * *